United States Patent [19]

Press et al.

[11] Patent Number: 4,681,349

[45] Date of Patent: Jul. 21, 1987

[54] PLASTIC LINED WELDED METAL COMPONENT AND METHOD OF MANUFACTURE

[75] Inventors: Irving D. Press, West Orange; John Krieg, Morristown, both of N.J.

[73] Assignee: Unidynamics Corporation, New York, N.Y.

[21] Appl. No.: 870,025

[22] Filed: Jun. 3, 1986

[51] Int. Cl.⁴ .............................................. F16L 13/02
[52] U.S. Cl. ..................... 285/55; 285/156; 285/286; 29/458; 228/214
[58] Field of Search ................... 285/55, 286, 156; 29/458; 228/214

[56] References Cited

U.S. PATENT DOCUMENTS

| | | | |
|---|---|---|---|
| 2,888,783 | 6/1959 | Turnbull | 285/55 X |
| 3,965,555 | 6/1976 | Webster et al. | 285/55 X |
| 4,357,745 | 11/1982 | Chlebowski | 285/55 X |
| 4,522,432 | 6/1985 | Press | 285/55 |

FOREIGN PATENT DOCUMENTS 1210063  3/1960  France .................. 285/55

Primary Examiner—Thomas F. Callaghan
Attorney, Agent, or Firm—Hopgood, Calimafde, Kalil, Blaustein & Judlowe

[57] ABSTRACT

The metal housings of multi-branched plastic lined components are welded in situ with the liner in place. A series of grooves in the outer surface of the preformed plastic liner underlie the weld joints and, in cooperation with a vent passage, prevent blow-out of the weld metal and damage to the plastic, all at higher welding temperatures sufficient to obtain deeper weld penetration.

25 Claims, 28 Drawing Figures

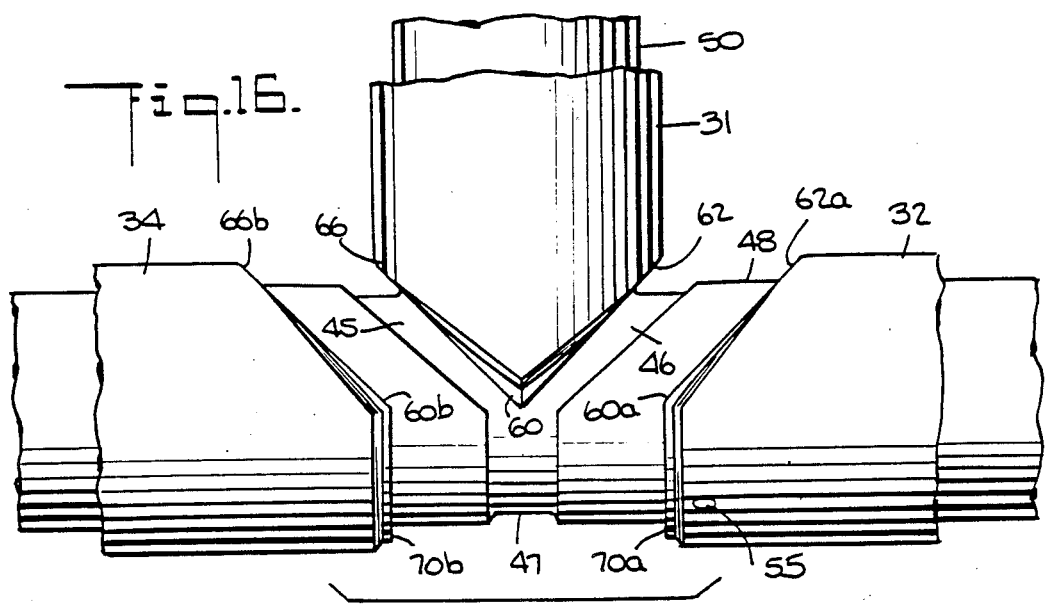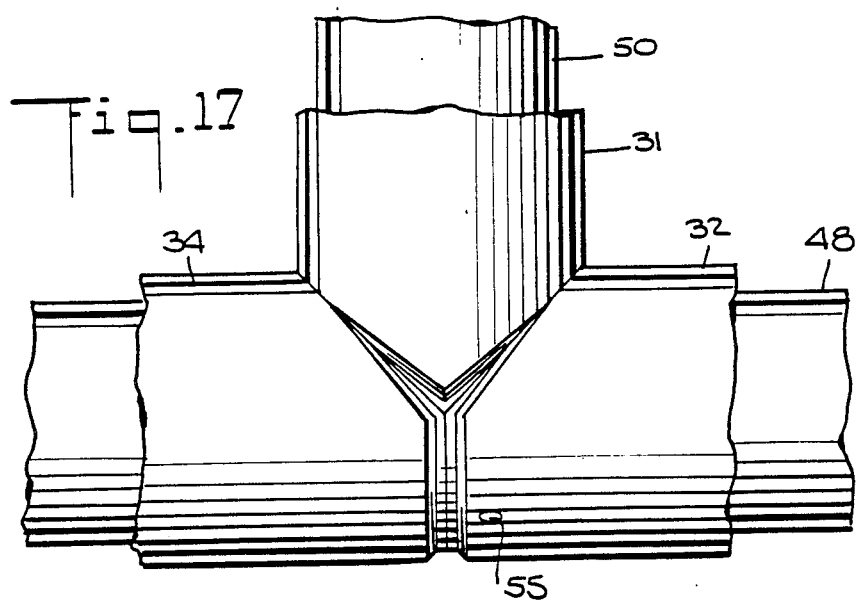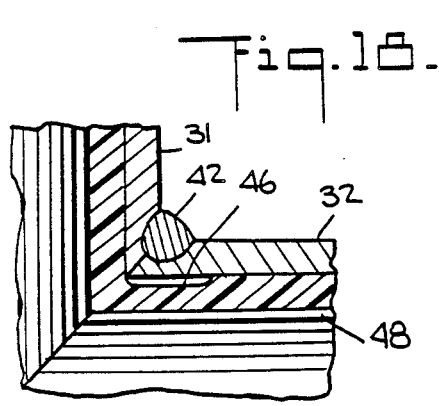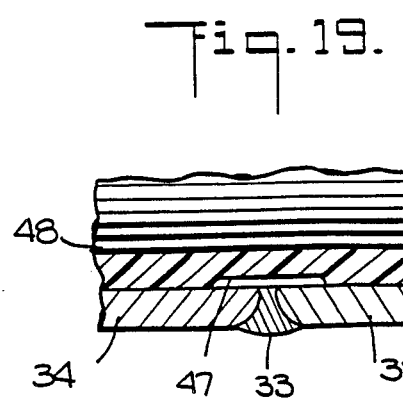

PLASTIC LINED WELDED METAL COMPONENT AND METHOD OF MANUFACTURE

BACKGROUND OF THE INVENTION

The present invention relates to a method for fabricating a plastic-lined weldment where welding is accomplished with the plastic liner in place, and to the plastic-lined weldment produced thereby.

In U.S. Pat. No. 4,522,432, issued June 11, 1985, on an application of Irving D. Press, and entitled "Components For Lined Piping System With Anchored Liners And Method Of Manufacture", assigned to the same assignee as the present application, there are disclosed, inter alia, tee and cross fittings which were produced by assembling metal stub ends over a preformed plastic liner, after which the joints between the stub ends were completed by welding. As explained in the patent in column 4, the stub ends were formed with the usual chamfered or beveled edge consisting of a root surface normal to the longitudinal axis of the stub end and a beveled surface. The patent text explained that if the weld is properly formed it should appear generally as shown in FIG. 6 of the patent which shows the weld essentially filling the vee-groove but with negligible root penetration. It was noted that preferably the weld is controlled or other means provided such that thermal degradation of the liner is minimized or avoided. The approach suggested in the patent was to ensure that the weld did not penetrate too far below the "break line", i.e., below the apex of the vee-groove; and the vee-groove had a depth about 50% of the thickness of the metal.

While fittings produced as disclosed in said patent have functioned satisfactorily in the field, and metal housings have not experienced failure in the weld areas, the present emphasis on safety has prompted search for a method by which greater weld penetration could be obtained. Weld penetration can be increased either by applying more welding heat to the joint or by modifying the joint geometry to provide a deeper groove or by a combination of both. Unfortunately, neither procedure can be utilized with heretofore known techniques without risk of causing thermal damage to the underlying liner. With both procedures increased heat reaches the plastic with detrimental effect. Moreover, the procedures are accompanied by increased outgassing of the metal both throughout the weld and from the adjacent base metal. In addition, some outgassing from the underlying plastic (e.g., PTFE) cannot be avoided. Any air trapped between the metal housing and the plastic liner tries to expand with the increase in temperature. All of these expanding gases tend to cause blowouts of the weld metal. Attempts to attain higher temperatures, if the weld metal does not blow out, results in weakening of the underlying plastic causing the latter to implode. Generally, however, blowout of molten metal occurs before implosion of the plastic, in either case relieving the pressure.

Whenever production of a plastic-lined welded metal component is considered, the usual question is why not fabricate the welded housing first, then mold the liner in situ? There are several objections to this procedure. Assuming that one could mold satisfactorily in situ, the finished liner cannot be inspected adequately for defects or imperfections. But in situ molding is otherwise unsatisfactory because of the differing thermal coefficients of expansion as between metal and plastic. Particularly with PTFE or similar resin the plastic will shrink back away from the wall of the housing as the two materials cool after molding. This results in a loose fitting liner. Also, where pipe fittings or piping is concerned, because the liner is flared over the several flange faces and the flares must be secured in place during molding, residual stresses are developed as the material shrinks upon cooling.

Preferably, as explained in the foregoing patent, the liners for the components are isostatically molded, and this is accomplished in precision molds outside of the eventual housing. This method is preferred for resins such as PTFE because the raw material cost for isostatic molding is less than that for extrusion molding.

SUMMARY OF THE INVENTION

It is, therefore, an object of the present invention to produce plastic-lined metal weldments where the welds are characterized by deeper penetration then heretofore attainable.

Another object is to produce welded joints, at least in the butt joint regions having 100% or close to 100% weld penetration in spite of the presence of an underlying plastic liner.

Yet another object is to provide a method for fabricating such welds that enables obtaining deeper penetration of both butt and fillet welds without deteriorating the encompassed plastic liner.

In accordance with one aspect of the present invention, there is provided a method for fabricating a plastic-lined weldment in which metal housing members are assembled about a preformed plastic liner and the joints between the housing members are welded, comprising in combination the steps of selecting a preformed plastic liner having grooves in its outer surface which grooves are located for underlying the joints to be welded coextensive with said joints, assembling about said selected liner said housing members with the joints located over said grooves, at least one of said housing members having path-defining surfaces for establishing communication between said grooves and the surrounding atmosphere when said housing members are assembled about said liner, and thereafter welding said joints.

In accordance with another aspect of the present invention there is provided a plastic-lined weldment comprising in combination metal housing members assembled about a preformed plastic liner with the joints between said housing members joined by weld metal, grooves in the outer surface of said plastic liner which grooves underlie said welded joints coextensive with said joints, and at least vestiges of path-defining surfaces in one of said housing members extending from the exterior of said weldment to a point in communication with said grooves.

BRIEF DESCRIPTION OF THE DRAWINGS

The invention will be better understood after reading the following detailed description of the presently preferred embodiments thereof with reference to the appended drawings in which:

FIG. 16 is an exploded view showing the stub ends of FIGS. 9 to 15 partially assembled over the liner of FIG. 8;

FIG. 17 is an elevational view, partially broken away, showing the stub ends of FIG. 16 brought together just prior to welding;

FIG. 18 is a view similar to FIG. 2, but of the fitting of FIG. 7 and showing the relationship between groove and weld in the fillet weld region;

FIG. 19 is a view similar to FIG. 3, but of the fitting of FIG. 7 and showing the relationship between groove and weld in the butt weld region;

FIG. 26 is a view similar to FIG. 8, but showing a modified liner construction.

The same reference numerals are used throughout the drawings to designate the same or similar parts.

DETAILED DESCRIPTION OF THE PRESENTLY PREFERRED EMBODIMENTS

Figure 1:
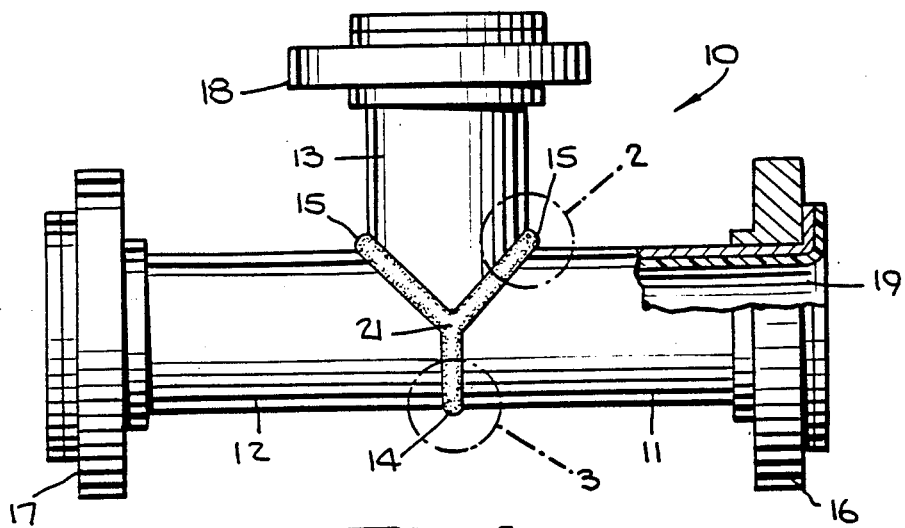
FIG. 1 is an elevational view, partly in section, of a tee pipe fitting illllustrative of the prior art.

Reference should now be had to FIG. 1 wherein is illustrated a tee fitting, 10, representing the prior art as disclosed in the above-identified patent. The tee fitting 10 has a metal housing formed from run stub ends, 11 and 12, and a stack stub end, 13, joined by welded seams, 14 and 15, and provided with Van-Stone flanges 16, 17 and 18. The housing of fitting 10 is lined with a precision preformed liner 19 of molded non-metallic material, e.g., isostatically molded polytetra- fluoroethylene (PTFE). As shown, the run and stack ends of the liner 19 extend outwardly of the stub ends 11-13 and are flared radially outwardly over the faces of the flanges formed on the stub ends.

As disclosed in said prior patent, the tee fitting 10 of FIG. 1 is constructed by taking the liner 19 and assembling over its run and stack sections the corresponding stub ends 11, 12, and 13, each previously assembled with the respective flanges 16, 17 and 18. It will be understood that the stub ends 11, 12 and 13 will previously have been formed each with a flange or flare at one end and with a welding edge, i.e., the usual chamfered or beveled edge, at the other end.

The liners for the fittings, details of which will be described more fully hereinafter, are isostatically molded, and this is accomplished in precision molds outside of the eventual housing. This method is preferred for resins such as PTFE because the raw material cost for isostatic molding is less than that for extrusion molding. A further advantage of preforming the liner is that it can be inspected for wall integrity and required wall thickness. This cannot be done reliably when the liner is molded directly in the eventual housing. Moreover, as explained above, there are additional disadvantages in attempting to mold directly within the metal housing. All in all, the isostatic molding method is presently preferred.

Referring again to FIG. 1, those skilled in the subject art will appreciate that the weld 15, at the peak of the corner joint within the phantom outline 2 where the stack stub end 13 joins the stub run end 11 at right angles, must be of the fillet type. On the other hand, at the lowermost point of the run section, within the phantom outline area 3, the weld 14 must be of a butt weld type.

Figure 2:
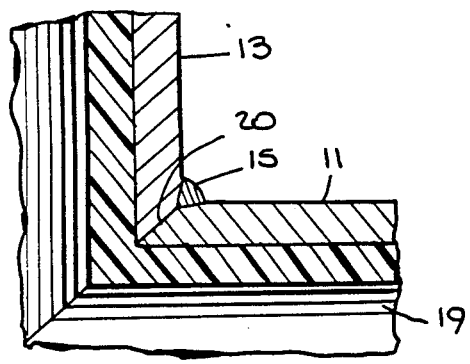
FIG. 2 is an enlarged fragmentary longitudinal sectional view of the corner or fillet weld in the area designated by the phantom circle, 2, in FIG. 1.

Referring now to FIG. 2 there is illustrated, in section, the fillet weld 15 which, as readily apparent from the drawing, penetrates only slightly into the joint 20 between the run stub end 11 and the stack stub end 13. The two weld types are shown in cross section in FIGS. 2 and 3, respectively. Referring to FIG. 2, there is illustrated the fillet weld 15 which, as readily apparent from the drawing, penetrates only slightly into the joint 20 between the run stub end 11 and the stack stub end 13. The butt weld is shown in FIG. 3 from which it can be noted that the weld penetration is through only slightly more than 50% of the total thickness of the joint between run stub ends 11 and 12.

Figure 3:
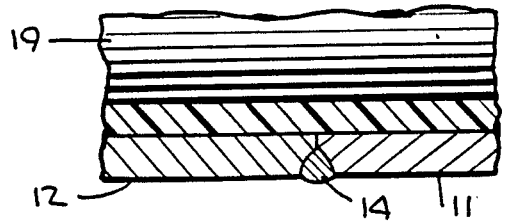
FIG. 3 is an enlarged fragmentary longitudinal sectional view of the butt weld in the area designated by the phantom circle, 3, in FIG. 1.

It should be evident that, throughout an arc of 180° extending downwardly from the intersection 21 and up to the corresponding point on the far side of the fitting, the run stub ends meet in a butt joint and that the weld cross section shown in FIG. 3 is typical of the weld throughout this region. Above the junction 21, however, there is a gradual transition from the butt weld as shown in FIG. 3 to the fillet weld as shown in FIG. 2 with maximum weld penetration nor exceeding that shown in FIG. 3.

Figure 2A:
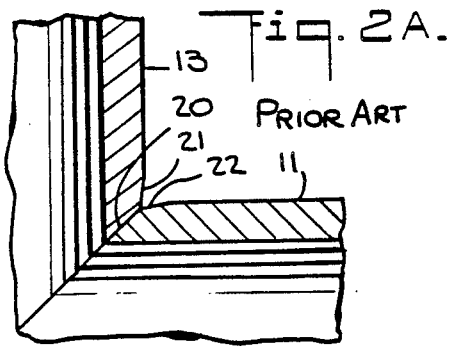
FIG. 2A is a view of the joint of FIG. 2 prior to welding showing the joint preparation with shallow bevel groove, the liner being omitted for clarity.
Figure 3A:
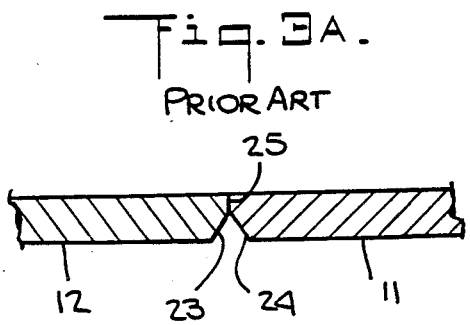
FIG. 3A is a view of the joint of FIG. 3 prior to welding showing the joint preparation or geometry with beveled vee-groove and zero root opening, the liner being omitted for clarity.

Edge preparation at the ends of the metal parts 11, 12 and 13 for producing the welded joints therebetween, as practiced prior to the present invention, is illustrated in FIG. 2A for the fillet weld and in FIG. 3A for the butt weld. Thus, referring to FIG. 2A, the ends of the stack stub end 13 and run stub end 11 are bevel cut at 20 at a bevel angle of 45°. A slight fillet notch is produced by an additional bevel cut to produce vee-groove faces 21 and 22. By comparing FIG. 2 and 2A it will be observed that the weld 15 barely penetrates beyond filling the vee-groove provided therefor.

The edge preparation for the butt weld is shown in FIG. 3A and it consists of a vee-groove having groove faces 23 and 24 and root faces that join with zero root opening along the junction 25. Again, comparing FIG. 3 with FIG. 3A it will be observed that the weld fills the vee-groove and barely penetrates the root region.

As explained in the prior patent identified above, the weld edge preparation and the welding temperatures were controlled to restrict weld penetration below the break line where the break line is the intersection between the vee-groove surfaces 23-24, respectively, with the root surface or face 25.

Figure 4:
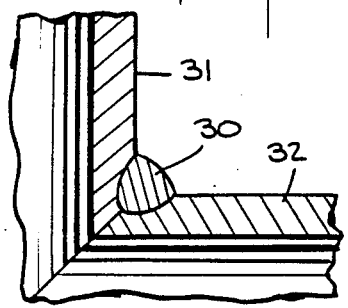
FIG. 4 is a sectional view similar to FIG. 2, but of an embodiment of the subject invention showing a fillet weld Produced in a corner joint with substantially deeper penetration than the weld in FIG. 2.

Referring now to FIG. 4, there is shown therein a fillet weld 30 of the type obtainable by the present invention in a weld joint between a stack stub end 31 and a run stub end 32, for example. The fillet weld 30 of FIG. 4 should be compared with that of weld 15 in FIG. 2. It should be readily apparent that substantially increased root and joint penetration has been achieved with an increased width to the face of the weld.

Figure 5:
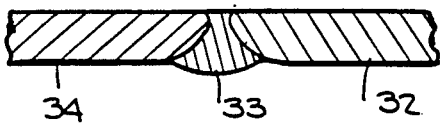
FIG. 5 is a sectional view similar to FIG. 3, but of an embodiment of the subject invention showing a butt weld produced with complete. penetration as compared to the partial penetration of FIG. 3.

A comparable improvement has been achieved in the butt weld region as seen in FIG. 5 which illustrates the weld 33 completely penetrating the joint between members 32 and 34 which constitute fragments of the run stub ends of a tee fitting constructed in accordance with the present invention.

Figure 6:
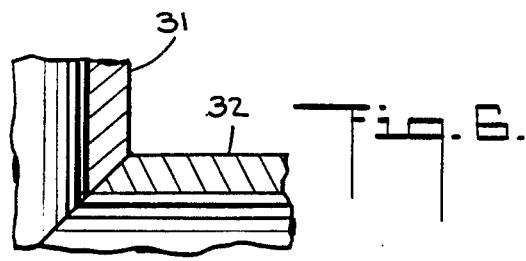
FIG. 6 is a view similar to FIG. 2A, but showing the joint geometry prior to welding of the joint of FIG. 4.
Figure 7:
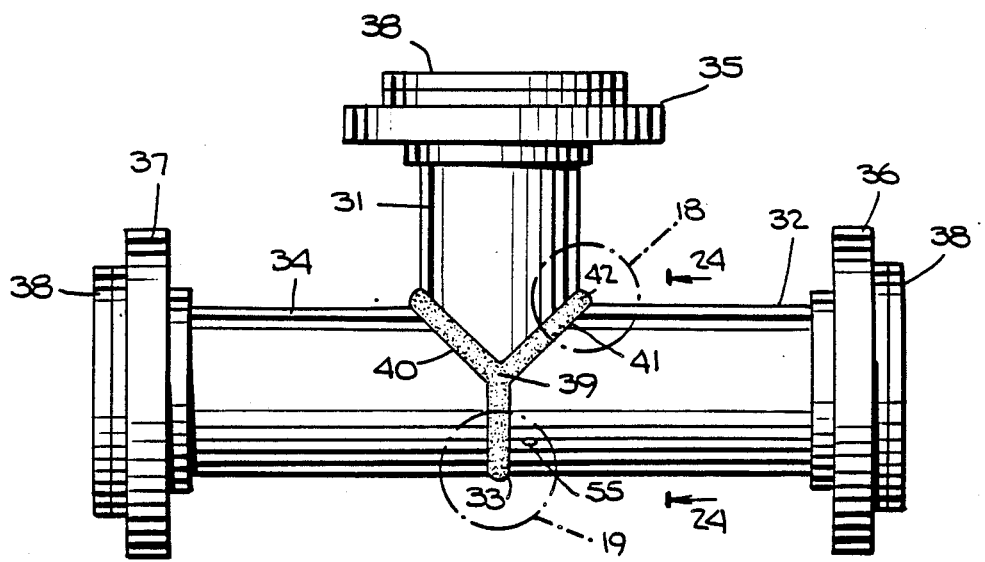
FIG. 7 is an elevational view of a tee pipe fitting representing a completed embodiment of the invention.

In order to provide some insight into the accomplishment of the present invention, attention is invited to the illustration of the weld joint edge preparation shown in FIG. 6 for the fillet weld illustrated in FIG. 4. Referring to FIG. 6, it will be seen that the joint edge preparation consists of a simple bevel cut between the stack stub end 31 and the run stub end 32, at least in the region there the two members intersect at 90°. The completed fitting is illustrated in FIG. 7 wherein the stub ends 31, 32, and 34 are shown with Van-Stone flanges 35, 36, and 37 and with the plastic liner flared radially outwardly over the stub end flanges at 38. As with the fitting of FIG. 1, the fitting in FIG. 7 has a butt weld joint extending from a junction at 39 downwardly (as viewed in the drawing) through an arc of 180° to a corresponding point on the far side of the fitting. This portion of the weld has a cross section as shown in FIG. 5 and is therefore designated by the reference numeral 33. There are two other weld portions that extend upwardly and over the run stub ends of the fitting from the junction 39 to the far side junction, and these weld portions are designated for purpose of identification by the numerals 40 and 41. The welds 40 and 41 may be considered as mirror images of each other. At the high point or the point where the stack stub end 31 intersects the run stub ends 32 and 34 at right angles, the welds 40 and 41 will have a cross section as illustrated in FIG. 4. However, as previously explained, the cross section of the weld will vary from that at the high point 42 down to that at the intersecting point 39. The variation is between that shown in FIG. 4 and that shown in FIG. 5.

Figure 8:
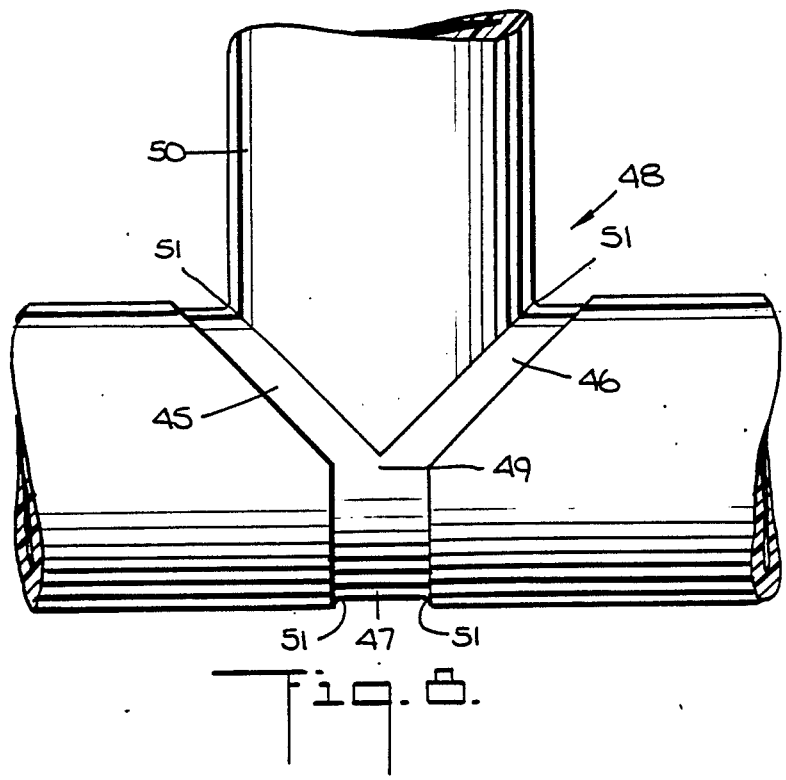
FIG. 8 is an elevational view of the pre-molded plastic liner for use in constructing the fitting of FIG. 7, with parts broken away for convenience in illustrating.
Figure 2B:
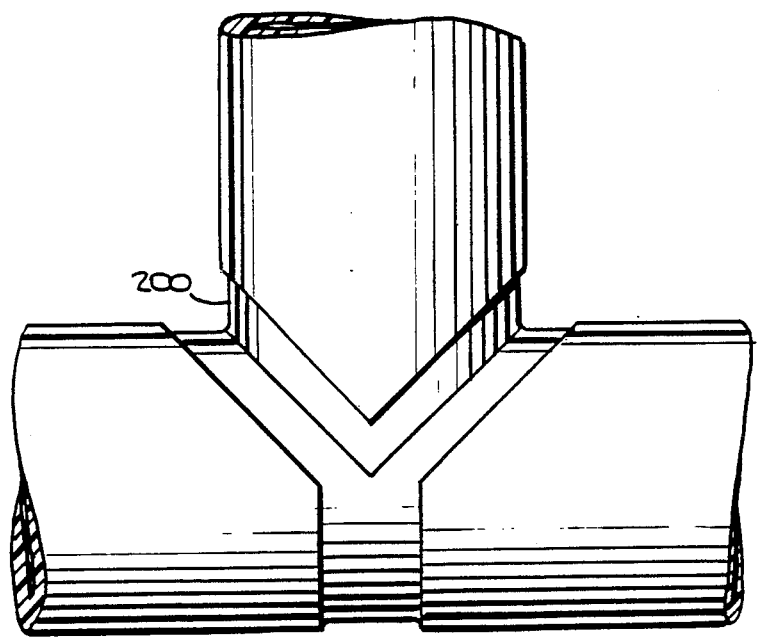

In order to obtain the welds of deeper penetration, shown in FIGS. 4 and 5, it is necessary to apply significantly more heat to the weld joint than that possible in fabricating the fitting illustrated with reference to FIGS. 1 to 3. It has been discovered that sufficient heat can be applied without damaging the underlying plastic liner if certain steps and modifications are undertaken. First, it is necessary to select a preformed plastic liner, see for example FIG. 8, having grooves 45, 46, and 47 in its outer surface which grooves are located for underlying the joints to be welded coextensive with said joints. As illustrated in FIG. 8, the liner designated generally by the reference numeral 48 has the groove 47 extending circumferentially over an arc of 180° from the intersecting point 49 around to the other side thereof. The grooves 45 and 46 diverge from the intersection 49 and straddle the stack portion 50 of the liner. To avoid unnecessary stress risers, the bottoms of the grooves are joined to the adjacent side walls of the liner by slight radii designated by the numeral 51.

Figure 9:
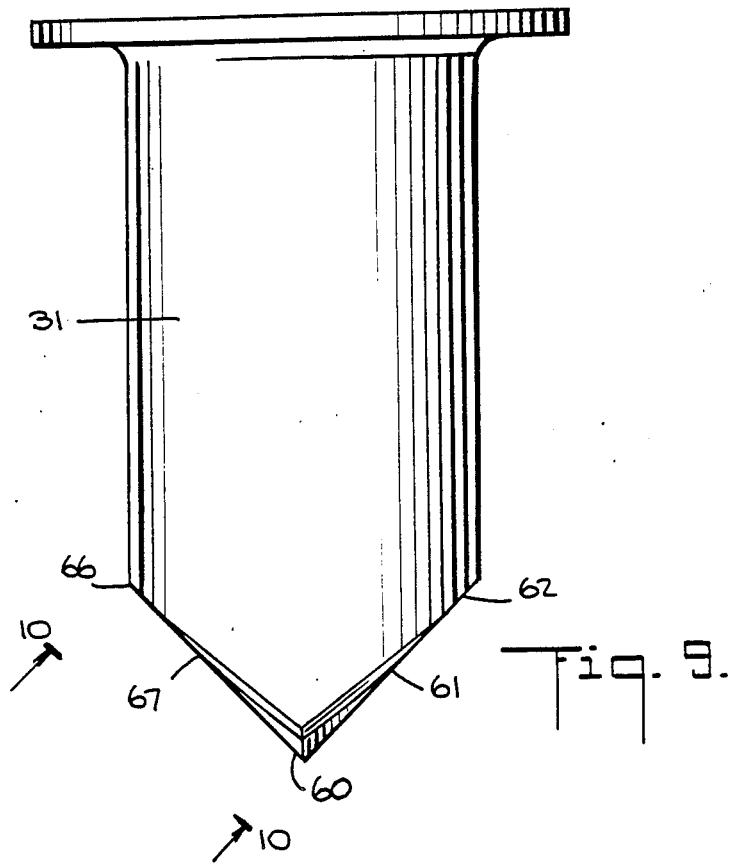
FIG. 9 is an elevational view of the stack stub end used to fabricate the embodiment of FIG. 7.
Figure 10:
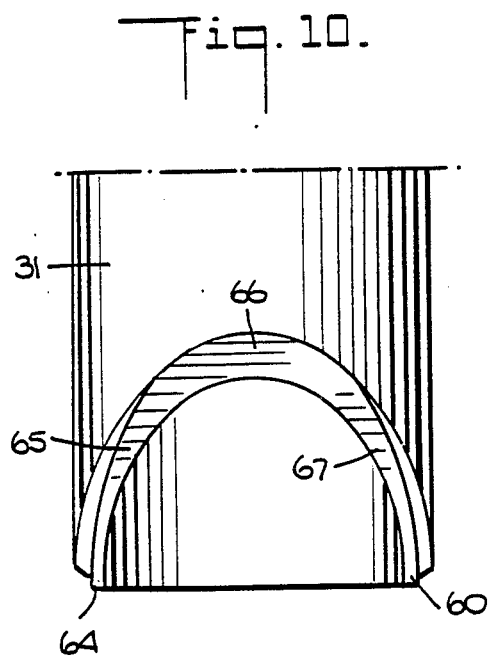
FIG. 10 is a partial auxiliary elevational view, as seen in the direction of the arrows 10,10 in FIG. 9.
Figure 11:
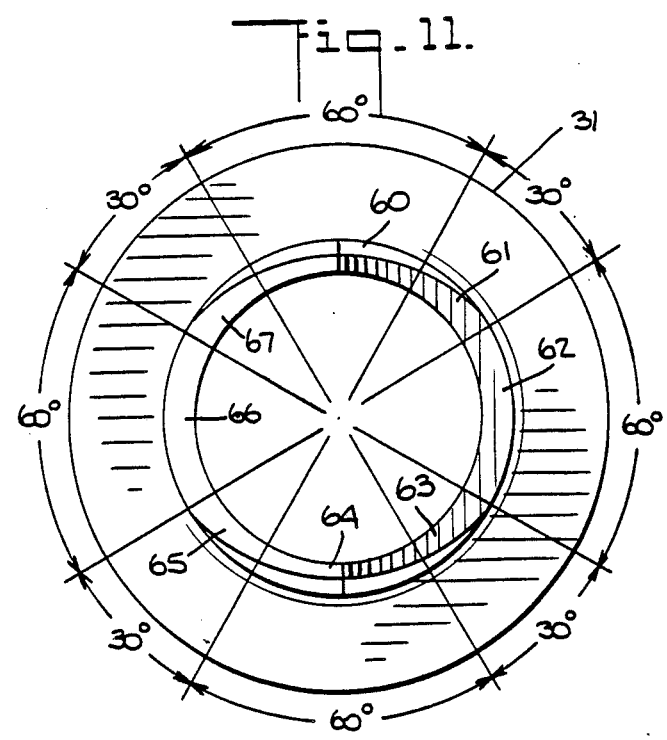
FIG. 11 is a bottom view of the stack stub end of FIG. 9.

The stack stub end 31 of the housing assembly is shown in detail in FIGS. 9, 10, and 11. The run stub end 32 is shown in detail in FIGS. 12 to 15, it being recognized that run stub end 34 can be identical to stub end 32. The stub ends 31, 32, and 34 are assembled over the liner 48 as shown in FIG. 16 and the stub ends are brought into engagement as shown in FIG. 17 whereupon welding takes place.

FIGS. 18 and 19 show, respectively, the relationship between the weld and the underlying grooves in the plastic at the locations designated by the phantom lined circles 18 and 19 in FIG. 7. Thus, FIGS. 18 and 19 relate to FIG. 7 in the same way that FIGS. 2 and 3 relate to FIG. 1.

It is important to observe that in the embodiment being described, a hole or aperture 55 is provided through the wall of the run stub end 32 as seen in any of FIGS. 7, 16, and 17. A similar hole or aperture, not shown, may or may not be provided in the other run stub end 34 depending upon manufacturing convenience. The subject invention relies upon the fact that at least one of the housing members, here the member 32, has path-defining surfaces for establishing communication between the grooves 45, 46, and 47 in the surface of the plastic liner and the surrounding atmosphere when the housing members are assembled about the liner. Therefore, the aperture 55 should be located at a point where it overlies or is in otherwise unobstructed communication with one of the grooves 45 to 47 when the housing members or stub ends 31, 32, and 34 are brought together in mutual engagement in preparation for welding.

Referring to FIG. 11, the welding end or the stack stub end is shown subdivided by arc designators into eight sectors or regions designated by the numerals 60 to 67, inclusive. These regions are configured to enable production of the different type welds discussed previously. The regions 62 and 66 are provided with a simple bevel angle for producing the joint of the type shown in FIG. 6 prior to welding. Regions 60 and 64 are configured for butt welding, and the details thereof will be discussed more fully with reference to the enlarged drawing of FIG. 20. Finally, there are four transition zones in the stack stub end and these zones have been designated by the numerals 61, 63, 65, and 67. These transition zones change uniformly from the simple bevel of the regions 62 and 66 to the special butt joint configuration of 60 and 64.

The angles shown on the drawing in FIG. 11 indicate the general arc extent of the different type welds. Thus, the fillet weld, when considered with regard to the stack stub end occupies two arc lengths of 60° each involving the regions 62 and 66. There is then a 30° transition zone where the weld changes from a fillet weld to a butt weld and then the two 60° zones where the weld is primarily of a butt weld nature.

Figure 12:
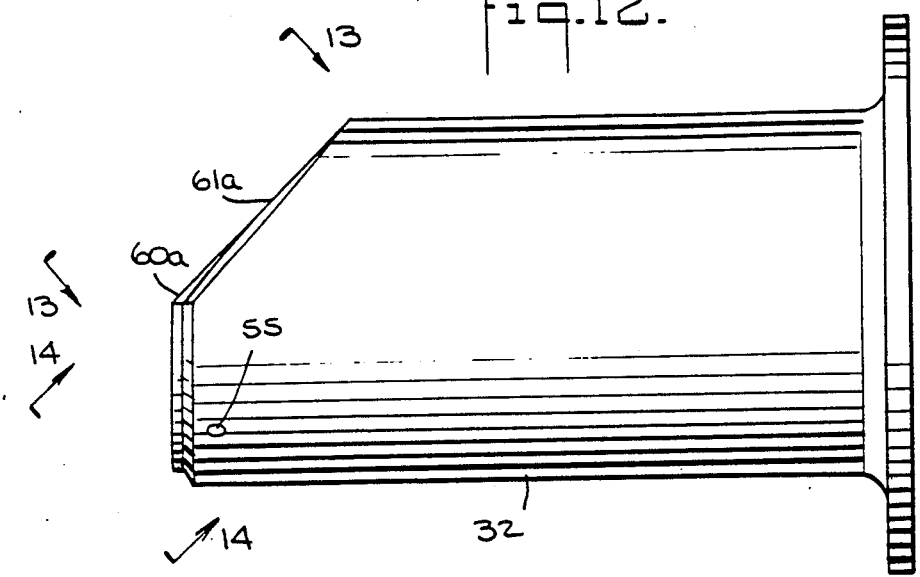
FIG. 12 is an elevational view of one of the run stub ends used to fabricate the embodiment of FIG. 7.
Figure 13:
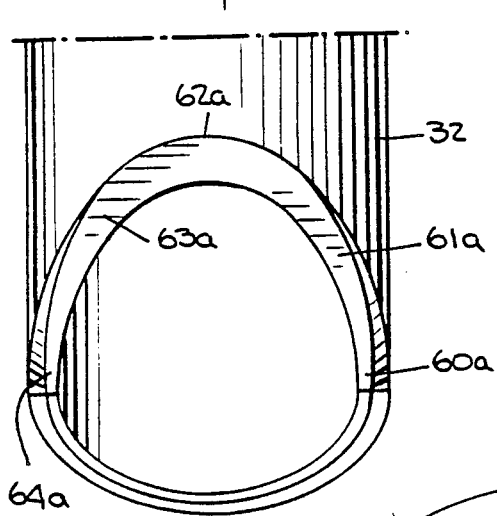
FIG. 13 is a partial auxiliary elevational view as seen in the direction of the arrows 13,13 in FIG. 12.
Figure 14:
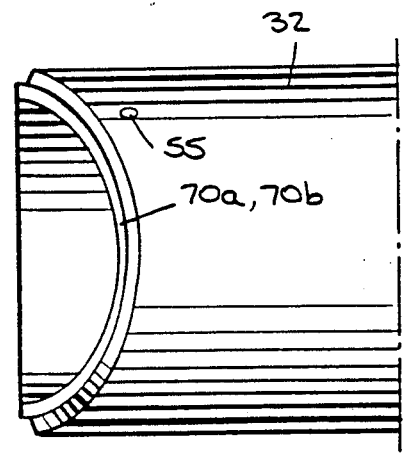
FIG. 14 is a partial auxiliary elevational view as seen in the direction of the arrows 14,14 in FIG. 12.
Figure 15:
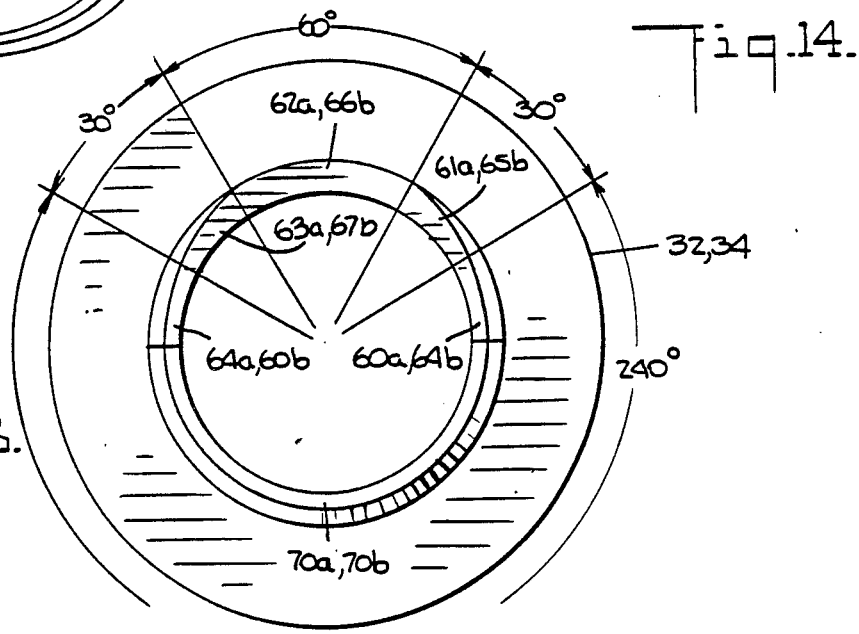
FIG. 15 is an end elevational view of the run stub end of FIG. 12.

Now referring to FIGS. 12 to 15, the same reference numerals applied to FIGS. 9, 10, and 11, are applied to FIGS. 12, 13, and 15, followed by an a or b, to designate the mating regions that cooperate to produce each of the welds. However, bearing in mind that the run stub end illustrated in FIG. 12 represents both parts 32 and 34, we have applied two reference numerals to each of the zones illustrated in FIG. 15 for coordination with one or the other run stub end. The letter a is used to designate surfaces on run stub end 32 while the surfaces on run stub end 34 are designated by the b suffix. Referring further to FIG. 15, the reference numerals 70a and 70b have been applied to the portion of the run stub end that cooperates to produce the butt weld joint.

Figure 20:
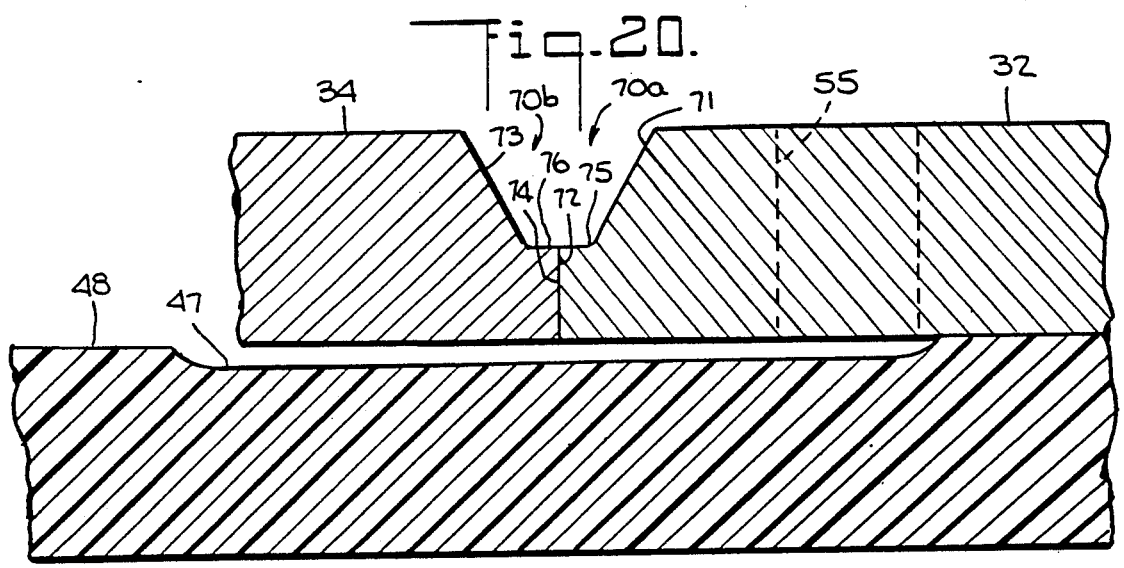
FIG. 20 is a greatly enlarged but fragmentary view of the butt weld joint preparation prior to welding.

The configuration of the butt weld groove surfaces can best be seen in FIG. 20 which represents a grossly enlarged fragmentary cross section of the weld joint prior to welding in relation to the underlying groove in the plastic. The view in FIG. 20 has been inverted, however, for convenience in viewing. The location relative to the groove 47 of the aperture 55 that is provided in the run stub end 32 should be readily apparent. As seen in FIG. 20 the housing member or run stub end 32 has its welding end prepared with a groove face 70a consisting of a bevel 71 and a squared off faying surface 72. The opposite stub end, 34, is similarly provided with a groove face consisting of a bevel 73 and a squared off faying surface 74. The faying surfaces 72 and 74 are joined to the respective bevel surfaces by longitudinally extending surfaces 75 and 76, respectively. Thus, as seen in FIG. 20, the joint produced by bringing the two groove faces 70a and 70b together contains a modified U-groove above a square groove having zero root opening. When this joint is welded, sufficient heat can be applied to cause the base metal at the faying surfaces to coalesce while filling the vee-groove with weld metal so as to produce a weld as shown previously in FIG. 5. While FIG. 5 shows complete penetration of the weld joint by weld metal, it should be understood that the weld would be quite satisfactory with only partial penetration of the root.

Reviewing FIGS. 9 to 17 and 20, it should be apparent how the weld edge preparation is brought into transition from the butt weld zone to the fillet weld zone.

Figure 21:
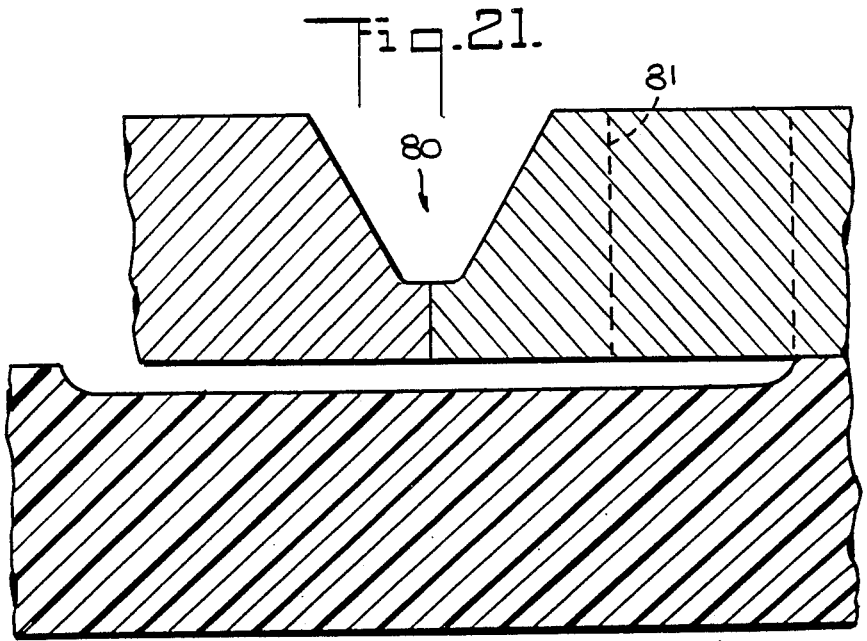
FIG. 21 is a view similar to FIG. 20 but showing a modification thereof.

The illustration in FIG. 20 of the butt weld joint is proportioned essentially to scale for a nominal 1½ inch tee fitting. As seen in the drawing the depth of the U-groove is slightly more than 50% of the wall thickness of the metal members. However, for larger size fittings, for example, a nominal 3 inch tee fitting, the proportions may be closer to those shown in FIG. 21 wherein the U-groove 80 has a depth approaching two thirds the thickness of the metal members. It also should be observed that the diameter of the vent hole or aperture 81 in the fitting illustrated in FIG. 21 is larger than that of the aperture 55 in FIG. 20. In essence, the cross section of the vent aperture should be scaled in proportion to the total volume of the passageways produced within the fitting by the grooves in the plastic liner.

Figure 22:
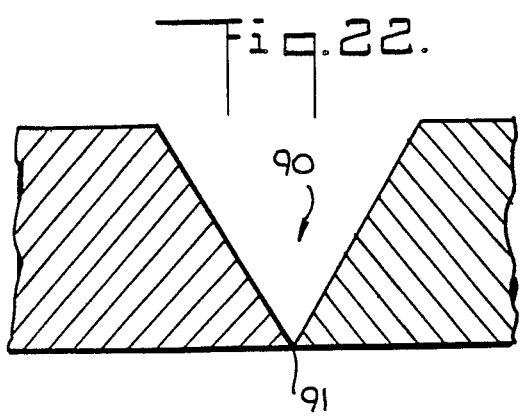
FIG. 22 is a fragmentary sectional view greatly enlarged of a single-vee groove joint modification prior to welding.

While the modified U-groove butt weld joint of FIGS. 20 and 21 is presently preferred, it is possible to produce satisfactory results with other weld configurations. For example, a satisfactory weld has been produced using a single vee-groove 90 as shown in FIG. 22. The principle drawback of this type of weld joint is that it is difficult to align the run stub ends that must be brought together at the sharp edges at 91.

Figure 23:
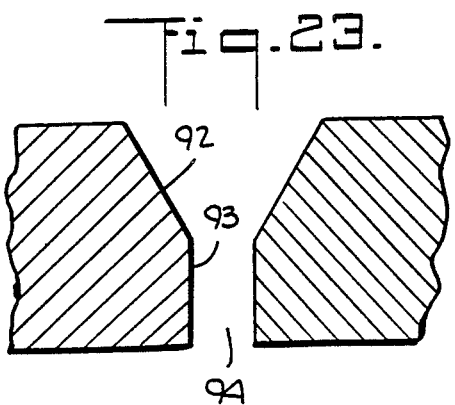
FIG. 23 is another view similar to FIG. 22 but illustrating a further modification of the weld groove.

Another configuration that has been used satisfactorily is that shown in FIG. 23 where the groove face has a bevel 92 that merges directly into the root face 93, and the members to be welded are positioned with a finite root opening 94 therebetween. The difficulty in fabricating a joint of the type shown in FIG. 23 is the necessity for maintaining the parts properly separated during the welding operation.

Figure 24:
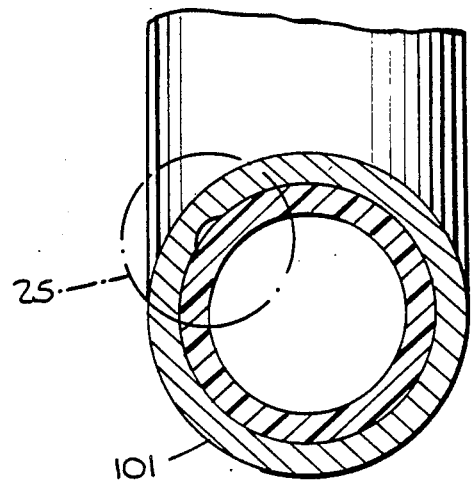
FIG. 24 is a transverse sectional view taken along line 24—24 in FIG. 7 and showing a shallow longitudinal groove in the I.D. of the housing.
Figure 25:
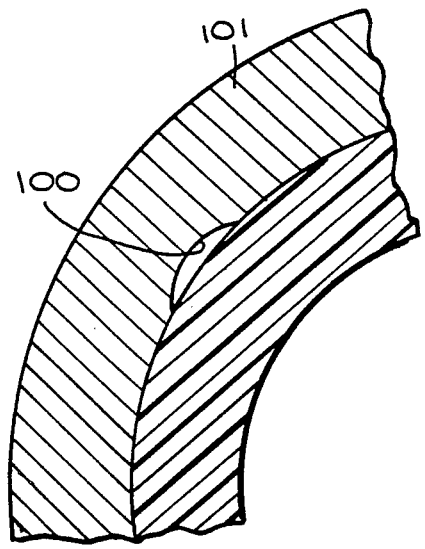
FIG. 25 is an enlarged sectional view of the area within the phantom circle 25 in FIG. 24.

While the previous figures have illustrated the use of a vent aperture in the side wall of the run stub end for establishing vent communication to the underlying passages formed by the grooves in the plastic liner, it is possible to provide other means of establishing communication between the groove-formed passages and the surrounding atmosphere. An example of an alternative arrangement is shown with reference to FIGS. 24 and 25 wherein a slight relief or channel 100 is formed longitudinally in the run stub end 101 so as to establish communication between the flange end of the run stub end 101 and the network of passages formed by the grooves in the plastic liner.

Alternatively, it is also possible to provide a slight discontinuity in the edge of the weld joint base metal and to control the welding so that the discontinuity is occluded by the weld at the end of the welding procedure such that venting is provided up until the final closure of the joint.

Merely by way of example, fittings have been produced in accordance with the present invention by using a liner in which the grooves 45, 46, and 47 (see FIG. 16) had the following general dimensions for a nominal 2 inch tee. The groove depth was 0.025 inches, the width of the groove 47 parallel to the longitudinal axis of the run section of the fitting was 0.625 inches while the longitudinal dimension of the grooves 45 and 46 parallel to the longitudinal axis of the run section was 0.375 inches. The cooperating vent aperture 55 had a diameter of approximately 3/32's of an inch.

Referring to FIG. 26 it will be observed that the grooves that straddle the stack portion of the liner have been carried for a short distance up the stack as shown at 200. This configuration provides slightly more relief around the weld joint in the fillet weld region than the embodiment shown in FIG. 8. However satisfactory results have been obtained with the FIG. 8 embodiment.

Under certain circumstances it may be desirable to close off or otherwise modify the path-defining surfaces, such as that provided by aperture 55, after welding has been completed. This might be desirable where the fitting is to be used in a piping system handling toxic or flammable fluids. In such instance, the aperture can be welded closed. Another possibility is to install a gas permeable liquid impermeable filter. Consequently, a weldment produced by the present invention may only retain a vestige of the vent hole or the like.

Although the invention has been described with reference to a tee fitting, it should be apparent that it can be applied to crosses, any other type of multi-branch fitting, or for that matter to any built up metal structure over a non-metallic liner. The grooves in the surface of the liner, while generally comparatively shallow, provide sufficient spacing between the weld joint and the plastic or non-metallic material to minimize thermal deterioration of the plastic or other material of the liner.

Having described the invention with respect to the presently preferred embodiments thereof, it will be understood that various changes in construction can be introduced by those skilled in the art without departing from the true spirit of the invention as defined in the appended claims.

What is claimed is:

1. A method for fabricating a plastic-lined weldment in which metal housing members are assembled about a preformed plastic liner and the joints between the housing members are welded, comprising in combination the steps of selecting a one piece preformed plastic liner having grooves in its outer surface which grooves are located for underlying the joints to be welded coextensive with said joints, assembling about said selected liner said housing members with the joints located over said grooves, at least one of said housing members having path-defining surfaces for establishing communication between said grooves and the surrounding atmosphere when said housing members are assembled about said liner, and thereafter welding said joints.

2. A method according to claim 1, wherein said joints are welded with the application of sufficient heat to produce substantially complete joint penetration.

3. A method according to claim 1, wherein said weldment is a tee fitting composed of a metal stack stub end and two metal run stub ends, and said joints are joined by fillet welds over arcs of approximately 60° centered about the points where said stack stub end meets said run stub ends at 90°.

4. A method according to claim 3, wherein said joints are joined by butt welds over arcs of approximately 240° centered about a point coinciding with the intersection of the extension of the longitudinal axis of said stack stub end and the wall of said run stub ends.

5. A method according to claim 4, wherein said weld arcs of 240° are joined to said weld arcs of 60° by welds that gradually vary from a butt configuration adjacent said weld arc of 240° to a fillet configuration adjacent said weld arc of 60°.

6. A method according to claim 5, wherein said grooves are continuous and all interconnected.

7. A method according to claim 4, wherein those portions of said joints between said housing members that are butt welded are prepared each with a groove face consisting of a bevel contiguous with a squared off faying surface, said faying surfaces being held separated to provide a finite root opening to produce a square-groove weld zone surmounted by a vee-groove weld zone, and said joint portions are welded to provide weld metal with joint penetration including at least partial root penetration.

8. A method according to claim 4, wherein those portions of said joints between said housing members that are butt welded are prepared each with a bevelled groove face forming root edges that are brought together to form a joint, and said last mentioned joint is welded to produce a vee-groove weld region.

9. A method according to claim 4, wherein those portions of said joints between said housing members that are butt welded are prepared each with a groove face consisting of a bevel and a squared off faying surface, said faying surfaces being joined to said bevel surfaces by a longitudinally extending surface such that the joint produced by bringing two such groove faces together contains a modified U-groove above a square groove having zero root opening, and welding said last mentioned joint to produce a weld with joint penetration including at least partial root penetration.

10. A method according to claim 1, wherein said grooves are continuous and all interconnected.

11. A method according to claim 1, wherein at least portions of said joints between said housing members are butt welded by preparing such housing members each with a groove face consisting of a bevel contiguous with a squared off faying surface, said faying surfaces being held separated to provide a finite root opening to produce a square-groove weld zone surmounted by a vee-groove weld zone, and said joint portions are welded to provide weld metal with joint penetration including at least partial root penetration.

12. A method according to claim 1, wherein at least portions of said joints between said housing members are butt welded by preparing said housing members each with a bevelled groove face forming root edges that are brought together to form a joint, and said last mentioned joint is welded to produce a vee-groove weld region.

13. A method according to claim 1, wherein at least portions of said joints between said housing members are butt welded by preparing said housing members each with a groove face consisting of a bevel and a squared off faying surface, said faying surfaces being joined to said bevel surfaces by a longitudinally extending surface such that the joint produced by bringing two such groove faces together contains a modified U-groove above a square groove having zero root opening, and welding said last mentioned joint to produce a weld with joint penetration including at least partial root penetration.

14. A method according to claim 1, wherein said weldment is a fitting having a plurality of intersecting branches formed by assembling stub ends with some of the surfaces of said stub ends coming together at a sufficiently acute angle that joint regions are produced in which fillet welds can be developed, other surfaces of said stub ends coming together at a sufficiently obtuse angle that other joint regions are produced in which butt welds can be developed, the further step of joining said fillet weld surfaces to said butt weld sufaces by transition regions, and producing continuous welds varying between butt and fillet to weld all of said regions.

15. A method according to claim 14, wherein those regions of said joints between said housing members that are butt welded are prepared each with a groove face consisting of a bevel contiguous with a squared off faying surface, said faying surfaces being held separated to provide a finite root opening to produce a square-groove weld zone surmounted by a vee-groove weld zone, and said joint regions are welded to provide weld metal with joint penetration including at least partial root penetration.

16. A method according to claim 14, wherein those regions of said joints between said housing members that are butt welded are prepared each with a bevelled groove face forming root edges that are brought together to form a joint, and said last mentioned joint is welded to produce a vee-groove weld region.

17. A method according to claim 14, wherein those regions of said joints between said housing members that are butt welded are prepared each with a groove face consisting of a bevel and a squared off faying surface, said faying surfaces being joined to said bevel surfaces by a longitudinally extending surface such that the joint produced by bringing two such groove faces together contains a modified U-groove above a square groove having zero root opening, and welding said last mentioned joint to produce a weld with joint penetration including at least partial root penetration.

18. A method for fabricating a plastic-lined weldment in which metal housing members are assembled about a preformed plastic liner and the joints between the housing members are welded, comprising in combination the steps of selecting a preformed plastic liner having in its outer surface a network of interconnected grooves located to underlie the joints to be welded coextensive with said joints, assembling about said selected liner said housing members with the joints located over said grooves so that a continuous passage exists within said housing members under the full extent of said joints, providing means for furnishing communication between said passage and the atmosphere, and welding said joints, whereby said passage and communication means provides release of pressurized gases that might otherwise blow out molten weld metal, and the spacing provided by said grooves minimizes thermal deterioration of the plastic of said liner.

19. A plastic-lined weldment comprising in combination metal housing members assembled about a preformed one piece plastic liner with the joints between said housing members joined by weld metal, grooves in the outer surface of said plastic liner which grooves underlie said welded joints coextensive with said joints, and at least vestiges of path-defining surfaces in one of said housing members extending from the exterior of said weldment to a point in communication with said grooves.

20. A plastic-lined weldment according to claim 19, comprising both butt and fillet welds.

21. A plastic-lined weldment according to claim 20, comprising a plurality of intersecting branches with transition type welds joining said butt welds to said fillet welds.

22. A plastic-lined weldment according to claim 21, wherein said path defining surfaces define an aperture through the wall of said one housing member.

23. A plastic-lined weldment according to claim 21, wherein said path defining surfaces define a channel along the inner surface of said one housing member.

24. A plastic-lined weldment according to claim 19, wherein said path defining surfaces define an aperture through the wall of said one housing member.

25. A plastic-lined weldment according to claim 19, wherein said path defining surfaces define a channel along the inner surface of said one housing member.

* * * * *